Nov. 30, 1971          E. TOMCZAK          3,623,380

PARKING BRAKE RELEASE MECHANISM WITH RECESSED HANDLE

Filed July 13, 1970          2 Sheets-Sheet 1

INVENTOR.
Eugene Tomczak
BY
D. D. McGraw
ATTORNEY

Nov. 30, 1971  E. TOMCZAK  3,623,380
PARKING BRAKE RELEASE MECHANISM WITH RECESSED HANDLE
Filed July 13, 1970  2 Sheets-Sheet 2

INVENTOR.
Eugene Tomczak
BY
D. D. McGraw
ATTORNEY

United States Patent Office 3,623,380
Patented Nov. 30, 1971

3,623,380
PARKING BRAKE RELEASE MECHANISM WITH RECESSED HANDLE
Eugene Tomczak, Troy, Mich., assignor to General Motors Corporation, Detroit, Mich.
Filed July 13, 1970, Ser. No. 54,109
Int. Cl. G05g 5/06
U.S. Cl. 74—540                                3 Claims

ABSTRACT OF THE DISCLOSURE

A hand-operated release mechanism for a parking brake control in which the release handle is stored in a recess in the instrument panel, is displaced rearwardly into the driver's reach when the parking brake is applied and retracts into the instrument panel recess after the vehicle operator pulls the release handle to disengage the parking brake.

The invention relates to a parking brake control mechanism and more specifically to a hand-operated release mechanism for a parking brake control device in which the release handle is stored in a recess in the instrument panel. The release handle is displaced rearwardly out of the recess and into the driver's reach when the parking brake is applied, and retracts into the instrument panel recess after the vehicle operator pulls the release handle to release the parking brake.

Pedal-operated parking brake control mechanisms are commonly equipped with a release handle which is mounted beneath the instrument panel. The handle is pulled by the vehicle operator and disengages a pawl or other locking device to release tension from the brake cable. This invention provides a release handle which retracts into a recess in the instrument panel upon release of the parking brake, resulting in a more aesthetically pleasing vehicle interior and eliminating a protrusion into the passenger compartment.

The brake actuating pedal lever is pivotally mounted on a stationary bracket and has ratchet teeth formed on an arcuate segment. The ratchet teeth are engaged by a spring biased pawl which locks the pedal lever when the brake is applied. A cam lever is pivotally mounted on the bracket and is engaged by a cam actuating tab attached to the pedal lever. A push rod is pivotally mounted on the cam lever and engages the brake release handle. As the pedal lever is actuated the cam actuating tab causes the cam lever to rotate about its pivotal mount and to advance the pushrod, thereby displacing the brake release handle out of its recessed storage position in the instrument panel.

A brake release linkage connects the pawl and the brake release handle so that when the brake release handle is pulled by the vehicle operator the pawl is disengaged from the pedal lever ratchet teeth. As the pedal lever returns to the brake released position following release handle actuation, the cam lever and pushrod return to their brake released positions, allowing a spring to return the brake release handle to its recessed position in the instrument panel.

The cam lever has two surfaces which are arranged to allow the handle to be displaced out of the recess during an initial increment of pedal actuation and to dwell at a fully extended position during further pedal actuation so that regardless of the braking force applied to the pedal by the vehicle operator, the handle will always be advanced the same distance out of the instrument panel.

Figure 1:
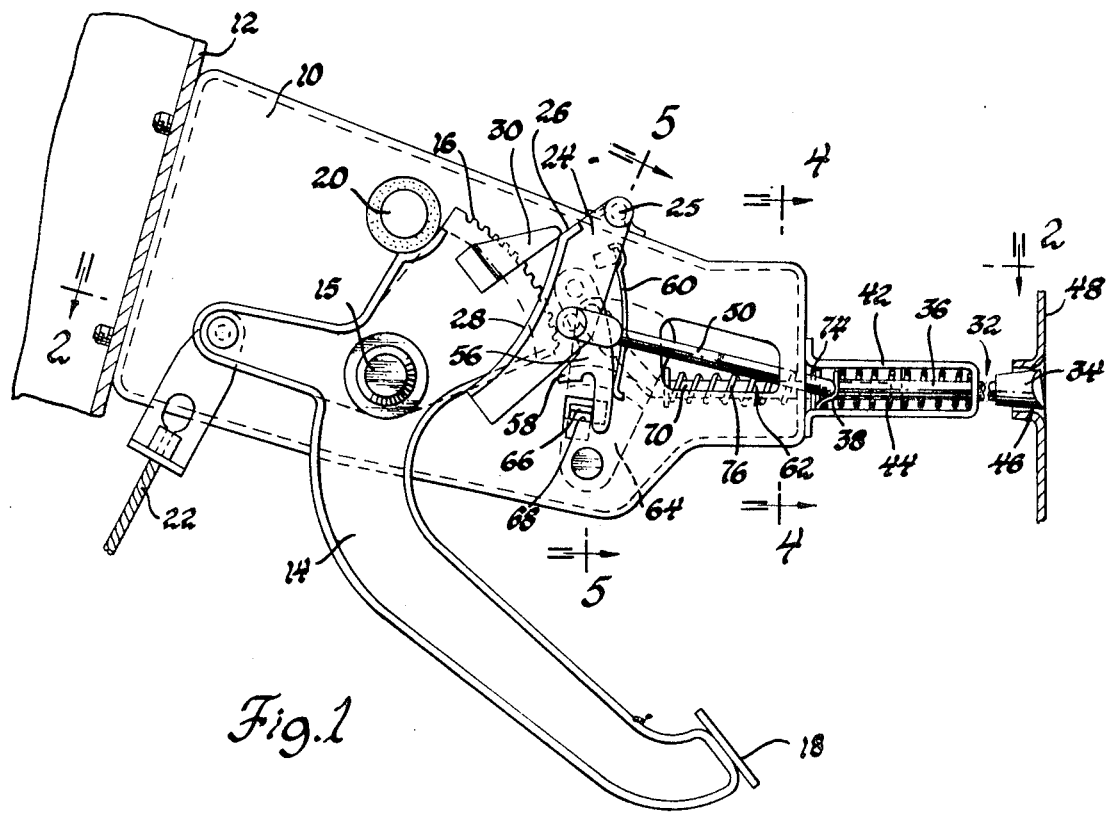
FIG. 1 is an elevation view of the parking brake release with recessed handle shown in the brake released position.
Figure 2:
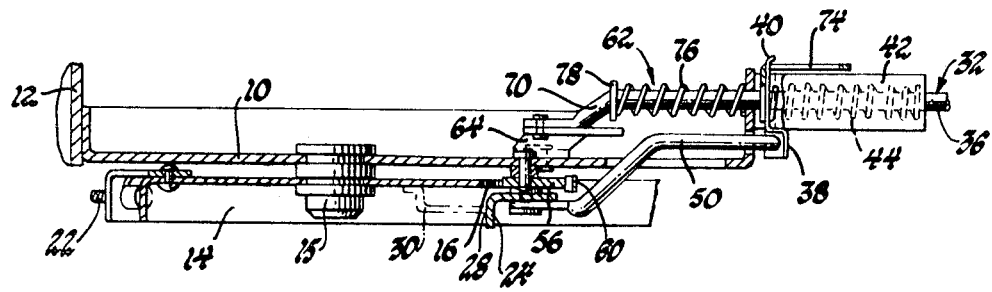
FIG. 2 is a cross-section view of the parking brake release with recessed handle of FIG. 1 taken in the direction of arrow 2—2.

Referring to FIG. 1, bracket 10, the stationary frame member of the mechanism, is attached to the vehicle wall 12. Pedal lever 14 is pivotally mounted on bracket 10 and has ratchet teeth 16 formed in an arcuate segment. Force applied to the pedal 18 by the vehicle operator causes the pedal lever 14 to rotate about pivot point 15 and to tension the brake cable 22, which is attached to the pedal lever in an appropriate manner. The rotation of pedal lever 14 is limited in the brake apply direction by the tension in the brake cable and in the brake release direction by stop 20.

A cam lever 24, having a first cam surface 26 and a second cam surface 28, is pivotally mounted on bracket 10. Cam actuating tab 30 is mounted on pedal lever 14 and engages the cam lever 24 at the first and second cam surfaces 26 and 28. The first cam surface 26 extends generally radially from the pivot point 25 of cam lever 24 so that during an initial increment of pedal lever actuation about pivot point 15, cam actuating tab 30 causes cam lever 24 to rotate about pivot point 25. The second cam surface 28 extends arcuately with respect to the pedal lever pivot point 15 at a radius equal to the radius of rotation of cam actuating tab 30 so that when the came actuating tab 30 reaches the second cam surface 28 no further motion of cam lever 24 results from further pedal lever actuation.

Brake release handle 32 consists of a knob 34, rod 36 and a laterally extending attachment forming cup 38 and hook 40. The cup 38 and hook 40 are caged in housing 42. Spring 44 urges the brake release handle in a forward direction, away from the vehicle operator and into a recess 46 formed in the instrument panel 48. Push rod 50 is pivotally attached to cam lever 24 and extends to rest in cup 38 of the brake release handle 32.

A pawl 56 is provided to lock the pedal lever 14 in the brake applied position. Pawl 56 is pivotally mounted on bracket 10 and includes an abutment 57 and a tooth 58. Spring tang 60 is mounted on bracket 10 and engages pawl 56 to continuously urge tooth 58 of pawl 56 into locking engagement of ratchet teeth 16 of pedal lever 14. The ratchet teeth 16 and tooth 58 are formed in such a manner as to allow free travel of the brake lever 14 in brake applying direction and to provide locking engagement of the pedal lever 14 in the brake releasing direction.

A brake release linkage 62 connects the brake release handle 32 and the pawl 56 to provide for the release of the pedal lever 14 from the brake applied position. Link 66 is pivotally mounted on bracket 10 and includes tab 66 which extends through aperture 68 of bracket 10 to engage abutment 57 of pawl 56. Brake release connector 70 is pivotally attached to link 64. A slotted member 74 is attached to brake release connector 70. Hook 40 of brake release handle 32 extends through the slotted member 74 forming a lost motion connection between brake release handle 32 and brake release connector 70. Spring 76 encircles release connector 70, is seated against handle housing 42 and acts against spring seat 78 of release connector 70 to continuously urge the release connector 70 and the attached link 64 away from pawl 56. The tab 66 of link 64 engages the wall of aperture 68 to limit travel of the brake release linkage 62 and hold the pawl 56 poised for locking engagement with the pedal lever ratchet teeth 16.

The brake release condition of the brake control mechanism is shown in FIG. 1. Pedal lever 14 abuts stop 20 at the urging of cable 22. Brake release handle 32 is withdrawn into recess 46 at the urging of spring 44. Cam lever 24 abuts the actuating tab 30 at the urging of spring 44. Tab 66 abuts the wall of aperture 68, holding pawl 56 poised for locking of the ratchet teeth 16 upon pedal actuation.

Figure 3:
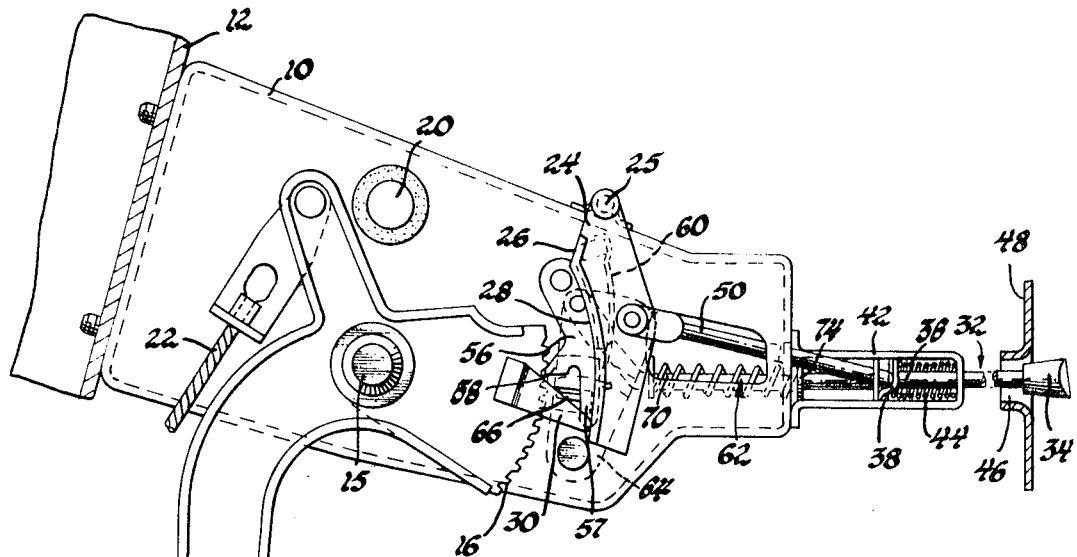
FIG. 3 is an elevation view of the parking brake release with recessed handle of FIG. 1 shown in the brake applied position.
Figure 5:
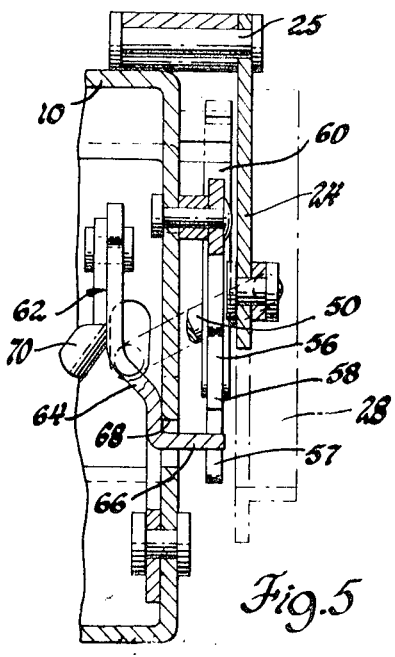
FIG. 5 is a cross-section view of the parking brake release with recessed handle of FIG. 1 taken in the direction of arrows 5—5.
Figure 4:
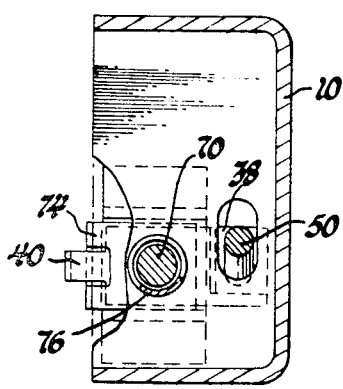
FIG. 4 is a cross-section view of the parking brake release with recessed handle of FIG. 1 taken in the direction of arrows 4—4.

The parking brake control mechanism is actuated by application of force to pedal 18, causing rotary movement of pedal lever 14 about pivot point 15 and thereby tensioning the attached brake cable 22. Movement of cam actuating tab 30 across the first cam surface 26 imparts rotary motion to cam lever 24 about its pivot point 25. This rotary motion of cam lever 24 displaces push rod 50 rearwardly toward the vehicle operator, overcoming spring 44 and pushing knob 34 out of storage in recess 46. When the cam actuated tab 30 reaches the point of juncture of the first cam surface 26 and the second cam surface 28, the release handle 32 has been displaced rearwardly to the extent shown in FIG. 3. Further rotary movement of pedal lever 12 and cam actuating tab 32 does not displace cam lever 24 since the second cam surface 28 extends arcuately with respect to the pedal lever pivot point 15. In this manner, the knob 34 is displaced out of recess 46 an identical distance upon each brake actuation regardless of the degree of brake actuation beyond that required to move tab 30 to the point at which it engages surface 28. The tooth 58 of pawl 56 engages the ratchet teeth 16 of the pedal lever 14 at the urging of spring tang 60 allowing movement of pedal lever 14 in a brake applying direction but preventing brake releasing movement. The brake release linkage 62 is not disturbed during brake actuation since the hook 40 of the brake release handle 32 moves through the slotted member 74 of release connector 70 as the brake release handle is displaced rearwardlly.

The operator releases the parking brake by pulling handle 34 causing hook 40 to engage release connector 70 pulling it rearwardly. Link 64 pivots on bracket 10, causing tab 66 to operatively engage abutment 57 and pull pawl 56 out of engagement with the ratchet teeth 16 of the pedal lever 14. As the pedal lever 14 pivots in a brake releasing direction at the urging of cable 22 and the tension in the brake cable, cam actuating tab 30 retrogresses along the second cam surface 28. When the cam actuating tab 30 reaches the first cam surface 28, spring 44 urges pushrod 50 and cam lever 24 to follow cam actuating tab 30, allowing knob 34 of release handle 32 to be retracted into storage in recess 46.

What is claimed is:

1. In a control mechanism having a stationary frame, a lever pivotally mounted on said frame for movement between a released position and a plurality of applied positions, ratchet teeth formed in an arcuate segment of said lever, and a pawl pivotally mounted on said stationary frame and biased into locking engagement of said ratchet teeth for holding said lever in the various applied positions, a release mechanism comprising:

cable means urging said lever to the released position;

a cam actuating tab mounted on said lever, a cam lever pivotally mounted on said stationary frame and having at least one cam surface engaged by said cam actuating tab whereby upon movement of said lever from the released position said cam lever is displaced rotatably;

a stationary wall having a recess therein, said control mechanism being located forwardly of said wall;

a release handle movable between a first position of storage in said recess of said stationary wall, a second position rearward of said stationary wall, and a third position rearward of said second position;

first linkage means operatively connecting said cam lever and said release handle at least upon movement of said lever from said released position, whereby said release handle is urged rearwardly out of said first position of storage in said recess of said stationary wall to said second position;

second linkage means operatively connecting said pawl and said release handle at least upon movement of said release handle to said third position whereby said pawl is urged out of locking engagement of said ratchet teeth to allow return of said lever to said released position;

and means providing forward movement of said release handle at least upon movement of said release handle to said third position to return said release handle to said first position of storage in said recess of said stationary wall.

2. The control release mechanism of claim 1 further characterized by said cam lever having first and second cam surfaces, said first cam surface being generally radially extending from the pivot mount of said cam lever on said stationary frame, said second cam surface being arcuate in shape and of a radius equal to the radius of rotation of said cam actuating tab, whereby during an initial increment of movement of said lever from said released position said cam actuating tab engages said first cam surface and displaces said cam lever rotatably to urge said release handle rearwardly to said second position, and whereby during further movement of said lever from the released position said cam actuating tab engages said second cam surface allowing said release handle to dwell at said second position.

3. In a brake control mechanism having a stationary frame, a lever pivotally mounted on said frame for movement between a brake released position and a plurality of brake applied positions, ratchet teeth formed in an arcuate segment of said lever, and a pawl pivotally mounted on said stationary frame and biased into locking engagement of said ratchet teeth for holding said lever in the various brake applied positions, a release mechanism comprising:

cable means urging said lever to the brake release position;

a cam actuating tab mounted on said lever, a cam lever pivotally mounted on said stationary frame and having first and second cam surfaces, said first cam surface being generally radially extending from the pivotal mount of said cam lever on said stationary frame, said second cam surface being arcuate in shape and of a radius equal to the radius of rotation of said cam actuating tab;

a stationary wall having a recess therein, said control mechanism being located forwardly of said wall;

a release handle having a laterally extending cup and a laterally extending hook, said release handle being movable between a first position of storage in said recess of said stationary wall, a second position rearwardly of said stationary wall, and a third position rearwardly of said second position;

first linkage means including a pushrod pivotally mounted on said cam lever and engaging said cup of said release handle upon movement of said lever from said brake released position, whereby during an initial increment of movement of said lever from said brake released position said cam actuating tab engages said first cam surface and displaces said cam lever rotatably to urge said release handle rearwardly to said second position, and whereby during further movement of said lever from said brake released position said cam actuating tab engages said second cam surface allowing said release handle to dwell at said second position;

second linkage means operatively connecting said pawl and said release handle upon movement of said release handle to said third position, said second linkage means including;

a link pivotally mounted on said stationary frame and having a tab engaging said pawl upon pivotal movement of said link to urge said pawl out of locking engagement of said ratchet teeth to allow return of said lever to said brake released position, a release connector pivotally attached at one end to said link and having a slotted member attached to the other end, said hook of said release handle extending through said slotted member and forming therewith a lost motion connection allowing said release handle to move from said first position to said second position without operatively engaging said release connector, and upon movement of said release handle from said second position to said third position and said hook of said release handle operatively engages the slotted member of said release connector to pivot said link, and spring means continuously urging forwardly movement of said release handle.

References Cited

UNITED STATES PATENTS 2,835,140   5/1958   Cox _____ 74—542
3,194,085   7/1965   Kirk.

MILTON KAUFMAN, Primary Examiner

U.S. Cl. X.R.

74—512